Figure 1:
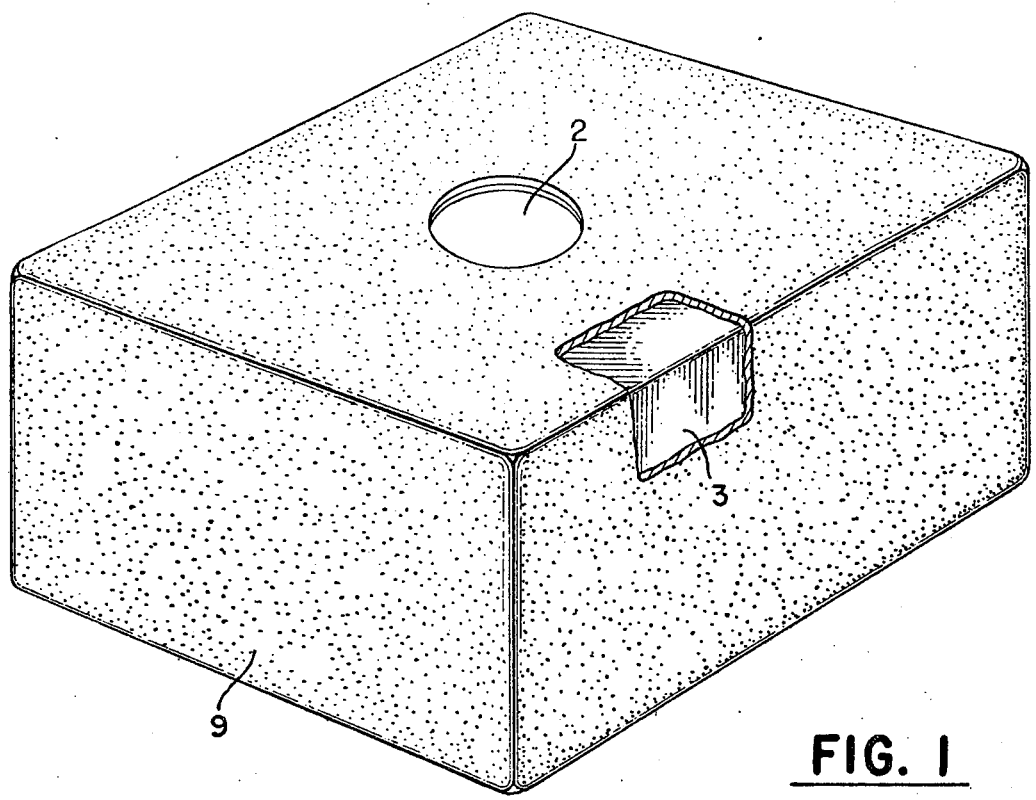

United States Patent [19]

Musyt

[11] 4,123,582
[45] Oct. 31, 1978

[54] BUILDING FORM FOR MOLDED ARTICLES HAVING A URETHANE COATING

[75] Inventor: William Musyt, Akron, Ohio

[73] Assignee: Goodyear Aerospace Corporation, Akron, Ohio

[21] Appl. No.: 781,608

[22] Filed: Mar. 28, 1977

Related U.S. Application Data

[60] Division of Ser. No. 379,639, Jun. 13, 1973, abandoned, which is a continuation of Ser. No. 153,085, Jun. 14, 1971, abandoned, which is a continuation of Ser. No. 789,111, Jan. 2, 1969, abandoned.

[51] Int. Cl.$^2$ .................. B32B 27/10; B32B 29/06
[52] U.S. Cl. .................................... 428/335; 428/425; 428/447; 428/446; 428/474; 428/480; 428/483; 428/493; 428/494; 428/496; 428/508; 428/421; 428/510; 428/517; 428/518; 428/520; 156/598; 156/532; 156/535; 156/538; 264/338; 264/309; 264/221; 264/317; 264/226; 264/255; 264/DIG. 44; 428/533; 428/284; 428/308; 428/314; 428/315

[58] Field of Search ............... 264/338, 309, 221, 317, 264/226, 220, 255, DIG. 44; 156/598; 428/425, 508, 335, 532, 533, 538, 332, 333

[56] References Cited

U.S. PATENT DOCUMENTS

| | | | |
|---|---|---|---|
| 2,360,899 | 10/1944 | Scharenberg | 156/598 X |
| 2,458,886 | 1/1949 | Weeldenburg | 428/532 X |
| 2,624,715 | 1/1953 | Wildish | 428/532 X |
| 2,700,181 | 1/1955 | Wilson | 156/598 X |
| 3,307,993 | 3/1967 | Gottwald et al. | 428/535 X |
| 3,492,393 | 1/1970 | Nourot et al. | 264/279 |

Primary Examiner—P. C. Ives
Attorney, Agent, or Firm—F. W. Brunner; H. C. Young

[57] ABSTRACT

A building form and method of preparing molded articles thereon which comprises molding an article on the casting surface of a building form comprising a casting surface adhered to a water destructible support layer, the said casting surface comprising a water permeable polymeric film, water destructing the said support layer, water penetrating the said casting surface, and removing the molded article.

1 Claim, 2 Drawing Figures

U.S. Patent     Oct. 31, 1978     4,123,582

BUILDING FORM FOR MOLDED ARTICLES HAVING A URETHANE COATING

This application is a divisional application of Ser. No. 379,639, filed June 13, 1973, now abandoned, which in turn was a continuation of application Ser. No. 153,085, filed June 14, 1971, now abandoned, which in turn was a streamline continuation of application Ser. No. 789,111, filed Jan. 2, 1969, now abandoned.

This invention relates to a method for the preparation of molded articles and to the molded articles. More particularly, this invention relates to building forms and methods of preparing molded articles therefrom.

Heretofore molded articles have been prepared by stepwise depositing an uncured polymeric material on a casting surface of a rigid water destructible building form, curing the polymeric material to provide a shaped article and recovering the molded, shaped article by destroying the building form with water. Such building forms are normally prepared from water destructible materials such as cardboard having a nonwoven fibrous texture. Thus, after the article is shaped and cured, the cohesiveness of the fibers of the building form for each other is destroyed with water which causes the building form to disintegrate away from the molded article. The water destructible building forms are highly advantageous for molding substantially closed containers because of their relative ease of removal from the inside of the molded container.

However, serious disadvantages are attendent when using water destructible building forms for preparing molded articles. The molding or casting surface of the building form normally requires a release agent coating to prevent the molded article from adhering to the form. Release agent coatings which are water insoluble tend to remain adhered to the molded article when the building form is water destroyed and have to be subsequently removed from the article. Water soluble release agents applied as solutions to the surface of the form promote its destruction before the article is shaped and molded thereon. Furthermore, voluminous small fibers, projecting outwardly from fibrous building forms such as carboard, tend to become attached and embedded in the surfaces of molded articles when they are cured, particularly articles prepared from liquid polyurethane mixtures, causing imperfections in the surface of the articles such as pinholes and greatly reducing their utility. Protection against such defects is difficult to obtain even if the form is coated with a release agent.

Figure 2:
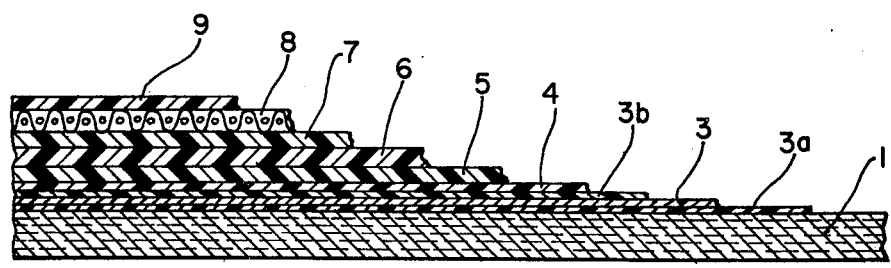

The advantages and objects of this invention may be more readily understood by reference to the drawings wherein FIG. 1 is a perspective view of a building form having a fuel tank formed or molded over its casting surface and FIG. 2 is a partial fragmented view of the building form, its casting surface and a composite structure suitable as a wall for containing liquid hydrocarbons molded thereon such as a wall of the fuel tank of FIG. 1.

Reference to the figures shows a building form having a water destructible support layer 1 which can be of various materials such as cardboard, paper and plaster, in the general shape of the article or tank to be prepared. It is usually preferred to use a rigid water destructible cardboard having a nonwoven fibrous texture as the support layer. The support layer can be of various thicknesses such as from about 0.1 to about 0.3 inches although it can be thicker or thinner depending upon the rate of water destruction desired and the desirable rigidity. An opening 2 is provided in the top of the building form to facilitate its later removal from the molded or cast article.

A water permeable casting surface 3 is adhered to the water destructible support layer 1 such as by lamination or bonding with a water soluble bonding agent or cement 3a. It is preferred that the water permeable casting surface is a film or coating having a thickness of from about 0.0005 to about 0.002 inches and a water permeability of at least from about 4000 to about 8000 grams or higher per 100 square meters per 24 hours as determined by ASTM Test No. E96E. Various water permeable films and coatings can be used provided they have the desired water permeability. Representative of various water permeable materials are regenerated cellulose such as cellophane, ethyl cellulose, polyethylene oxide and hydroxyethyl cellulose. It is usually preferred to use a regenerated cellulose such as cellophane. It is also desired that the casting surface on the building form will not tightly adhere to the molded article. For example, it is desired that it will not tightly adhere to a polyurethane layer deposited on it when the polyurethane layer is cured. The casting surface of the building form can be coated with a water soluble releasing agent 3a, if desired, to assist in preventing the molded article from tightly adhering to the surface. Many of the various water soluble release agents known to those skilled in the molding art can be used such as the sugars, polyvinyl alcohols and methyl cellulose.

Over the casting surface is applied at least one spray coat of a polyurethane reaction mixture 4,5. The polyurethane coats are built up to a desired thickness and usually allowed to dry and at least partially cure before applying the next coat. Although the polyurethane coats may be allowed to dry and at least partially cure until tack-free, at this stage it is usually desired that the polyurethane coat be sufficiently tacky to adhere to a film of fuel or liquid hydrocarbon barrier material. To the polyurethane coat is adhered a film or coating of a fuel barrier material 6, if desired. Various fuel barrier materials can be used such as nylon and polyesters of the type prepared from dicarboxylic acids such as terephthalic acid and isophthalic acid and polyols such as ethylene glycol and 1,4-butane diol. The liquid hydrocarbon barrier material layer can be applied to the building form or to any of the polyurethane coats. Then it is usually desired to apply at least one spray coat of a polyurethane reaction mixture 7 over the fuel barrier layer. It is appreciated that a textile fabric covering 8 can be applied to the building form, or to the polyurethane coats to add strength to the polyurethane structure. Various textile fabrics can be used such as nylon, rayon, cotton and polyester woven fibers. It should be apparent that additional spray coats of a polyurethane reaction mixture 9 can be applied to increase the thickness of the container wall. The various coats of polyurethane can be dried and cured within a relatively short time, with the application of heat, if desired, usually within about an hour or less depending upon the nature of the polyurethane reaction mixture and the curative utilized.

The inside of the building form is half filled with water at about 60° C. The water is soaked and preferably sloshed or agitated by shaking inside of the building form for about 30 minutes until the rigidity of the cardboard support layer is destroyed. The water is allowed to soak, preferably by agitation, for approximately an additional 30 minutes until water permeates the water permeable casting surface and releases the cured polyurethane. Evidence of the destruction of the rigidity of the cardboard support layer is its marked increase in pliability if the casting layer remains adhered thereto or its reduction to smaller pieces usually floating in the water if the cardboard is released from the casting layer. The casting surface was collapsed and, with the cardboard and water, withdrawn from the cast, cured polyurethane container.

In the description of the drawings, molded articles are prepared by spray coating a liquid polyurethane reaction mixture onto a casting surface of a building form and reacting the polyurethane reaction mixture to set and gel, which is the preferred method. The building form is then removed by water destruction. However, it is to be understood in the practice of this invention that other castable materials can be deposited onto the building form to form molded articles. Preferably the castable materials are polymeric materials and usually they are preferred to be flexible polymeric materials. Polymeric materials can be applied to the casting surface, for example, as suspensions or solutions of thermoplastic and thermoset plastics and rubber-like polymeric materials and precipitated or coagulated and dried. They can also be applied by the deposition of molten thermoplastic materials and the cooling and solidifying of the molten materials thereon. It is preferred to deposit polyurethane reaction mixtures because of ease of handling and their fast reaction time in forming the cast polymeric materials in situ on the building form. Although it is preferred that the flexible plastic and rubber-like materials are deposited by spraying, it is to be appreciated that they can be applied to the casting surface by other suitable methods such as by brushing and by dipping of the liquid materials and also by depositing the rubbery and thermoplastic materials in sheet form. It is an important feature of this invention that molded articles such as containers having complex curved surfaces can be built inside of and around building forms having convex and concave surfaces.

The building form is referred to as having a water destructible layer. Generally this is descriptive of material having a rigidity which is destoryed or will disintegrate or break into smaller pieces when exposed or contacted with water, preferably agitated water, at a temperature of at least about 60° C. for about 120 minutes and preferably about 60 minutes. When its rigidity is destroyed, water has penetrated the support material and contacted the casting surface. If the support layer remains adhered to the casting layer without substantially disintegrating away therefrom, upon release from the molded article, the casting surface is collapsed and withdrawn from the article, with the now pliable support layer adhered thereto.

In preparing molded articles according to this invention it is usually desired that a sufficient amount of the polymeric material is deposited to provide layers of material having wall thicknesses of from about 1 to about 50 mils. Each successive coat can be dried or partially dried or cured or at least partially cured before the application of the next coat or covering.

Various polymeric materials can be used including their suspensions such as dispersions and emulsions. For example, thermoplastic and thermoset polyesters prepared from dicarboxylic acids such as terephthalic acid and isophthalic acid and glycols having from 2 to 6 carbon atoms such as ethylene glycol, 1,3-propane diol and 1,4-butane diol. It is usually preferred to form molded articles of rubbery polymers and copolymers and plasticized particulate vinyl resins. Representative of various polymeric materials which can be deposited on the building form by suitable means are rigid and flexible polyurethanes, silicone rubbers such as the cured millable gum silicone rubbers, natural rubber and the various synthetic rubbers such as rubbery polymers of conjugated dienes such as 1,4 addition polymers of 1,3-butadiene and of isoprene, polychloroprene; the rubbery copolymers of butadiene and styrene which contain a major proportion of butadiene, particularly copolymers of butadiene and styrene of the hot and cold SBR type which contain from 60 to about 90 percent by weight of butadiene; copolymers of butadiene and acrylonitrile; butyl rubber, which is a polymerization product of a major proportion of a monoolefin, such as butylene, and a minor portion of multiolefin, such as butadiene and isoprene; copolymers of ethylene and propylene; and terpolymers of ethylene, propylene and a minor proportion of a nonconjugated diene and flexible polymers formed by the open ring polymerization of unsaturated alicyclic compounds having from one through three carbon-to-carbon double bonds in the alicyclic ring such as polyoctenamers and polydodecenamers. The various polymers and copolymers can be compounded with suitable vulcanizing materials such as sulfur or peroxides and with vulcanization accelerators so that they can be cured after their deposition.

Representative plasticized vinyl resins are plasticized polyvinyl chloride and plasticized copolymers of vinyl chloride with another vinyl compound such as vinyl chloride-vinyl acetate copolymers, vinyl chloride-vinyl ether copolymers, vinyl chloride-maleate or fumarate copolymers and vinyl chloride-vinylidene chloride copolymers. The particulate vinyl resins can be plasticized with plasticizers well known to those skilled in the art, applied to the surface and heated to coalesce the resin particles and form a flexible layer.

Polyurethanes are normally applied to the building form as a reaction mixture which reacts to form the polyurethane in situ on the form although polyurethanes can be applied as a dispersion or solution.

Suitable polyurethane reaction mixtures are, for example, mixtures of the materials that are commonly used to prepare rigid or flexible polyurethanes and polyurethane foams by the well-known one-shot, prepolymer or semi-prepolymer techniques. For example, see U.S. Pat. No. 3,401,050 and U.S. patent application Ser. No. 670,276, filed Sept. 25, 1967, now abandoned.

Generally, the polyurethane reaction mixtures are prepared from at least one reactive hydrogen containing polymeric material as determined by the Zerewitinoff method and at least one organic polyisocyanate. It is to be understood that the polyurethanes referred to in this specification may also contain polyurea linkages.

In the preparation of the various polyurethane reaction mixtures usually the more useful reactive hydrogen containing polymeric materials comprise at least one member selected from the group consisting of polyester polyols, polyether polyols, dihydroxy-terminated polymers of conjugated diene hydrocarbons, and castor oil. The reactive hydrogen-containing material generally used has a molecular weight between about 700 and about 5000 and, usually, between about 1000 and about 4000. Generally, the polyester polyols are the preferred active hydrogen-containing material where high strength and solvent resistance are desired.

Where foamable polyurethane reaction mixtures are to be prepared, to form rigid and flexible cellular polyurethanes, polymeric reactive hydrogen containing compounds having relatively low molecular weights (hydroxyl numbers of from about 350 to about 600) can be used to prepare rigid foams and such compounds having relatively high molecular weights (hydroxyl numbers of from about 30 to about 120) can be used to prepare flexible foams. The density of the prepared foam is dependent somewhat upon the type and amount of fluid expanding agent used.

The foamable polyurethane reaction mixture can contain water or various well-known inert fluid-expanding or blowing agents to cause the said reaction mixture to foam. It is usually desired that the inert fluid-expanding agents be gaseous at room temperature. The term "inert" means that the expanding agent does not detrimentally react with the reaction mixture. Representative examples of various blowing agents include air, nitrogen, carbon dioxide and halogenated hydrocarbons, exemplary of which are methylene chloride, trichloromonofluoromethane, dichlorodifluoromethane and 1,2-dichlorotetrafluoroethane. The foamable polyurethane reaction mixture can also contain relatively small amounts of various catalysts well known to those skilled in the art to increase its rate of reaction as well as various surfactive agents to assist in controlling the cell structure of the resultant foam.

Usually the ratio of isocyanate groups of the polyisocyanate, preferably an organic diisocyanate, to the reactive hydrogen-containing groups of the reactive hydrogen-containing polymeric material is from about 1.1/1 to about 12/1 and preferably about 1.2/1 to about 2.5/1. These materials can be reacted at temperatures from about 20° C. to about 150° C. to form a polyurethane prepolymer. The reactive hydrogens are supplied by hydroxyl groups and amine groups. This prepolymer can be dissolved or dispersed in the solvent to form a solution or dispersion which is then mixed with a catalyst, chain extending agent, and/or a crosslinking agent to form a polyurethane reaction mixture.

Agents which promote chain extension and crosslinking of the polymer are also useful and are sometimes known as curing agents which facilitate reacting the polyurethane reaction mixture to set and gel. Diamines, hydrocarbon diols, such as ethylene glycol and propylene glycol, hydroxyl-amines such as triisopropanolamine, are used in this invention as such agents. When these agents are used they are usually added to a polyurethane prepolymer in a ratio of from about 0.5/1 to about 1.5/1 and, preferably, about 0.8/1 to about 1.0/1 amine and/or hydroxyl groups of the chain extending and crosslinking agent for each, isocyanate group in excess of the reactive hydrogen groups of the reactive hydrogen-containing polymeric material. Bifunctional materials such as glycols and diamines are generally preferred as chain extending and crosslinking agents. In general, the bifunctional materials yield products having superior spraying properties. Other methods known to those skilled in the art of preparing polyurethane reaction mixtures with or without solvents being present may also be used.

When used as a molding material, except for foamable polyurethane reaction mixtures, a solvent is usually added to the reaction mixture so that it will be in the form of a fluid mixture or solution. Generally, sufficient solvent is added to form a solution containing from about 30 to about 65 percent solids. However, a higher or lower concentration of solids can be used. When the solids concentration is low, the individual applications will deposit a thin layer of the polyurethane polymer, and a large amount of the solvent will have to be removed during the curing process. A solids concentration of 40 percent or higher is generally desired.

Various nonreactive solvents known to those skilled in the polyurethane art can be used for the preparation of the prepolymer solutions and polyurethane reaction mixtures. Representative examples of the solvents are aromatic solvents such as benzene, xylene and toluene; and the liquid lower ketones such as acetone, methyl ethyl ketone, methyl isobutyl ketone, and diisobutyl ketone. If the polyurethane reaction mixtures are to be used to prepare the cured polyurethanes in confined areas which are subject to explosive hazards, nonflammable chlorinated solvents can be used to form nonflammable polyurethane reaction mixtures. Mixtures of solvents may also be used to obtain satisfactory spreading properties and evaporation rates when the polyurethane spray composition is applied to a polymeric surface.

If desired, pigments, surface-active agents, leveling agents, such as cellulose acetate butyrate, and other additives well known to the spray-coating art can be added to the solution or dispersion of the polyurethane reaction mixture. When a pigment is added, it is added in an amount from about 0.5 to 10 parts and, preferably, in the amount from about one to two parts of pigment per hundred parts of prepolymer by weight. Submicroscopic pyrogenic silica has been found to be an effective thixotropic agent. This material is prepared by the vapor phase hydrolysis of silicon tetrachloride. Such silica, sold under the trademark CAB-O-SIL by Godfrey L. Cabot, Inc., is useful as a thixotropic agent in the sprayable polyurethane compositions when used in about 0.1 to 10 parts by weight per 100 parts of the prepolymer in the solution. The preferred amount is from about 0.5 to about 4 parts by weight. This range of pyrogenic silica gives improved thixotropic properties to the resulting sprayable composition.

The building form of this invention can be used, for example, to prepare molded articles suitable as containers for various liquids such as hydrocarbons. For example, such containers prepared from polyurethanes having liquid hydrocarbon barriers therein can be suitable for containing various hydrocarbons and their mixtures exemplary of which are petroleum and coal tar distillates and various fuels such as gasoline and kerosene and various lubricating and fuel oils having boiling points at atmospheric pressure ranging from about −10° C. to about 400° C. and usually from about 0° C. to about 150° C. Suitable hydrocarbons are saturated aliphatic, saturated cycloaliphatic, unsaturated aliphatic, unsaturated cycloaliphatic, and aromatic hydrocarbons and mixtures of such hydrocarbons. Representative examples of these and other various saturated hydrocarbons are aliphatic hydrocarbons such as the butanes, the pentanes, the hexanes, the heptanes, the octanes and the nonanes; aromatic hydrocarbons such as benzene, toluene and xylene; saturated cycloaliphatic hydrocarbons such as cyclohexane; and various unsaturated hydrocarbons representative of which ae olefins such as the butenes, the pentenes, the hexenes, the heptenes, the octenes, and the nonenes; and diolefins such as the butadienes, the pentadienes, isoprene, the hexadienes, the heptadienes, and the octadienes. Various mixtures of unsaturated, saturated and aromatic hydrocarbons can also be contained.

The following illustrative example is set forth to further exemplify the objects and advantages of the invention. The parts and percentages are by weight unless otherwise indicated.

EXAMPLE I

A cube-shaped rigid building form was prepared by bonding and shaping a cardboard sheet having a casting surface of a film of water permeable cellophane bonded to its outer surface (obtained from the Packaging Corporation of America) to the shape of a cubicle box measuring three feet on a side. Each of the abutting edges of the sheet were joined by a strip of masking tape on the outside of the box. An oval shaped hole was provided in the top of the building form having dimensions of about 8 inches by about 12 inches to facilitate the removal of the building form from an article to be molded thereon.

The cardboard sheet was a double wall corrugated fiberboard having 51 flutes per linear foot and a thickness of about one-eighth inches. The cardboard had a nonwoven fibrous texture and a Mullem burst strength of 200 pounds according to the TAPPI standard test T-807. The water permeable cellophane (obtained as untreated cellophane 124 PD from E I duPont deNemours & Company) was a film having a thickness of about 1.6 mils and a water permeability of about 5000 grams per 100 square meters per 24 hours according to ASTM test method E96E. The cellophane film was bonded to the cardboard (by the Packaging Corporation of America) with a water soluble adhesive (obtained as Dextron 2-5595 from Swift & Company).

To the cellophane film on the outside of the cube-shaped building form was applied a thin coat of a water soluble sugar-based cement (obtained as 1692-C from The Goodyear Tire & Rubber Company). The sugar cement was allowed to dry. Two spray coats of a polyurethane reaction mixture were applied to the sugar-cement covered water permeable cellophane film on the building form. The first coat was allowed to partially dry before applying the second coat. The coats were then cured at about 110° C. for about 3 hours to form a molded cured polyurethane article suitable for holding liquids having a wall thickness of about 30 mils.

Warm water was then poured into the building form and agitated at about 60° C. for about 1 hour, thereby penetrating, softening and destroying the rigidity of the cardboard. Agitation of the water was continued at about 60° C. for another hour to allow the cellophane film to be penetrated by the water and the sugar cement to be dissolved by the water, thereby releasing the cellophane film from the molded polyurethane article. The cellophane film having the pliable, soft and watersoaked cardboard still somewhat adhered thereto, was easily collapsed and removed from the molded article. The water was poured out to yield a molded article in the shape of a container having an interior surface essentially free from pinholes and suitable for containing liquids.

The liquid polyurethane reaction mixture used in this example was prepared by mixing a prepolymer solution, also herein called Component 1, with a curative solution, also herein called Component 2.

A prepolymer was prepared by reacting one mol of polytetramethylene adipate having a molecular weight of about 1000 and a hydroxyl number of about 112, 0.5 mols of polytetramethylene azelate having a molecular weight of about 2000 and a hydroxyl number of about 56 and 3 mols of an 80/20 mixture of the 2,4 and 2,6-isomer of tolylene diisocyanate. The reaction was conducted at a temperature range of 80° C. to 100° C. for about 60 minutes. The product was then degassed by stirring at about 100° C. under vacuum. It was then allowed to cool to about 25° C. A solution of this prepolymer was prepared by dissolving 483.69 pounds (219 kg.) of the prepolymer in a solution consisting of:

| | |
|---|---|
| Methyl ethyl ketone | 26.86 gallons (102 liters) |
| Mixed xylene isomers | 22.04 gallons (83.5 liters) |
| Cellulose acetate butyrate | 2.63 pounds (1.2 kg.) |

To this solution was then mixed 5.33 pounds (2.42 kg.) of lamp black, giving a total of 100 gallons of prepolymer solution.

A curative solution was prepared by mixing:

| | |
|---|---|
| Methylene bis(o-chloroaniline) | 2.477 pounds (1.14 kg.) |
| Purified mercaptobenzothiazole | 0.163 pounds (0.074 kg.) |
| Methyl ethyl ketone | 0.772 gallons (2.92 liters) |
| | 1.00 gallons (3.79 liters) |

The polyurethane reaction mixture was then prepared as a spraying solution immediately prior to its application using the following mixture:

| | |
|---|---|
| 200 parts | Prepolymer Solution (Component 1) |
| 48 parts | Curative Solution (Component 2) |
| 4 parts | Sub-microscopic Silica (obtained as Cab-O-Sil from Godfrey L. Cabot, Inc.) |

Exemplary of various other prepolymers suitable for use in the formation of Component 1 of this example are:

Prepolymer A

A reaction product of 2 mols of tolylene diisocyanate with about 1 mol of a polyester having a molecular weight of from about 1000 to about 2000 formed by condensing an excess of ethylene glycol with adipic acid.

Prepolymer B

Same as Prepolymer A except that about 1.4 mols of the diisocyanate are reacted with the polyester.

Prepolymer C

Same as Prepolymer A except propylene glycol was used to produce the polyester instead of ethylene glycol.

Prepolymer D

Same as Prepolymer A except methylene diphenylene diisocyanate was used instead of toluene diisocyanate.

Prepolymer E

The same as Prepolymer C except methylene diphenylene diisocyanate was used instead of toluene diisocyanate.

Prepolymer F

The reaction product of 2 mols of toluene diisocyanate with 1 mol of a polytetramethyleneether glycol having a molecular weight of about 3000. cl Prepolymer G The reaction product of 2 mols of toluene diisocyanate with 1 mol of a polyester having a molecular weight of from about 1000 to about 2000 prepared by the condensation of adipic acid with an excess of a mixture consisting of 80 percent by weight ethylene glycol and 20 percent by weight propylene glycol.

Prepolymer H

The reaction product of 2 mols of toluene diisocyanate with 1 mol of a mixture of polyesters having molecular weights of about 1500 to about 2000 prepared by the polyester mixture comprised ⅔ by weight of a polyester prepared by the condensation of adipic acid with an excess of a mixture consisting of 80 percent by weightethylene glycol and 20 percent by weight propylene glycol and ⅓ by weight of a polyester prepared by the condensation of 1,4-butane diol and adipic acid.

Prepolymer I

The reaction product of 2 mols of toluene diisocyanate with 1 mol of a mixture of polyesters wherein the said mixture of polyesters comprises 50 percent by weight of polyester having a molecular weight of about 1800 to about 2000 prepared by the condensation of 1,4-butane diol with azelaic acid, and 50 percent by weight of a polyester having a molecular weight of from about 800 to about 1200 prepared by the condensation of 1,4-butane diol and adipic acid.

Thus, according to this invention, a building form has been provided for preparing molded articles which comprises a casting surface adhered to a water destructible support layer, the said casting surface comprising a water permeable and preferably water indestructible and insoluble polymeric film.

In further accordance with this invention, a method has been provided for preparing molded articles on a building form which comprises molding an article on the casting surface of a building form comprising a casting surface adhered to a water destructible support layer, the said casting surface comprising a water permeable and preferably water indestructible and insoluble polymeric film, water destructing the said support layer, water penetrating the said casting surface, and removing the molded article.

In the description, the building form is referred to as having a casting surface adhered to a water destructible support layer. It is to be understood that articles can be molded on the casting surface by depositing liquid materials and thereafter solidifying them thereon and by shaping the various polymeric materials in sheet form thereon. When the polymeric materials are deposited and shaped thereon in sheet form, usually sheets are used having a thickness of from about 1 to about 50 mils. The sheets may then be bonded together by cementing or curing.

The building form of this invention has utility in the preparation of molded articles such as containers having complex, curved surfaces such as fuel tanks. In the practice of this invention useful unitized, one-piece containers can be prepared for containing various fuels such as liquid hydrocarbons, including gasoline, without the inconvenience of having to separately shape two segments of the container and then bond the segments together. Thus, as referred to in the description of the drawings, the building form of this invention has particular utility in the preparation of containers by simply depositing a liquid polyurethane reaction mixture on its casting surface and curing the reaction mixture in situ to form a unitized container and removing the building form from the inside thereof by simple water destruction. Such a container can be prepared according to the method of this invention substantially free of pinhole defects normally caused by a water destructible building form such as, for example, cardboard.

While certain representative embodiments and details have been shown for the purpose of illustrating the invention, it will be apparent to those skilled in this art that various changes and modifications may be made therein without departing from the spirit or scope of the invention.

What is claimed is:

1. In a cardboard building form for preparing molded articles by spray coating a polyurethane reaction mixture thereon, curing the reaction mixture to form a molded article and removing it therefrom by water-destructing the building form, the improvement which comprises, in sequence, an outer, water soluble release agent coating over a water permeable cellophane film casting surface adhered with a water soluble cement to an inner, water destructible cardboard support layer, where said water soluble release agent and said water soluble cement are selected from at least one of sugar, polyvinyl alcohol, and methyl cellulose, and where said cellophane film has a water permeability of about 4000 to about 8000 grams per 100 square meters per 24 hours according to ASTM Test E96E and a thickness of from about 0.0005 to about 0.002 inch.

* * * * *